J. H. HENDRICK.
Bee Hive.

No. 69,431.

Patented Oct. 1, 1867.

Witnesses
Guy C. Humphries
Charles Kierren

Inventor
John H. Hendrick
by
D. E. Jones & Co
his Attorneys

United States Patent Office.

JOHN H. HENDRICK, OF CLINTON, ILLINOIS, ASSIGNOR TO HIMSELF AND JAMES O. DONALD.

*Letters Patent No.* 69,431, *dated October* 1, 1867.

IMPROVEMENT IN BEE-HIVES.

*The Schedule referred to in these Letters Patent and making part of the same.*

TO ALL WHOM IT MAY CONCERN:

Be it known that I, JOHN H. HENDRICK, of Clinton, in the county of De Witt, and in the State of Illinois, have invented a new and useful Improvement in Bee-Hives; and I do hereby declare that the following is a full, clear, and exact description thereof, reference being had to the annexed drawing, making part of this specification, in which—

Figure 1:
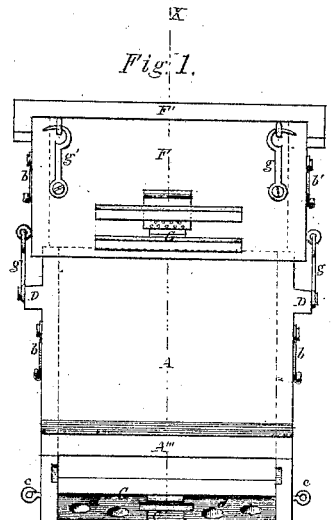
Figure 1 is a front elevation of the hive.
Figure 3:
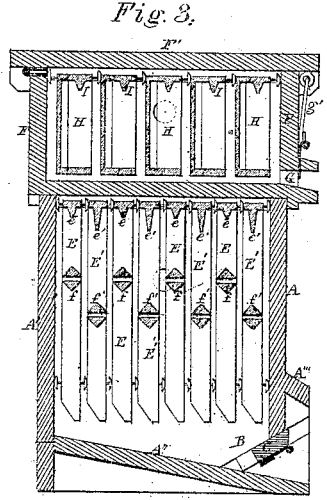

Figure 3, a vertical section on the line X X, fig. 1.

Figure 4:
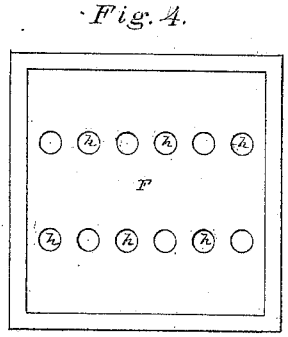

Figure 4, a plan or top view of a portion of the hive.

Figure 2:
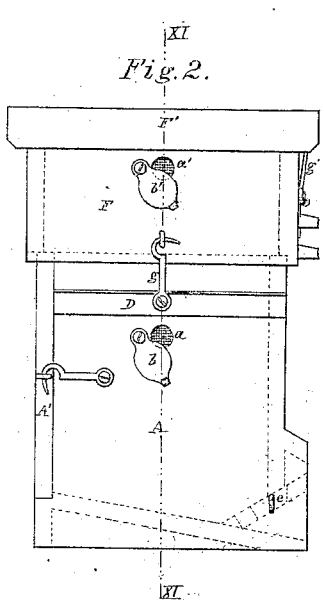
Figure 2 is a side elevation of the same.
Figure 5:
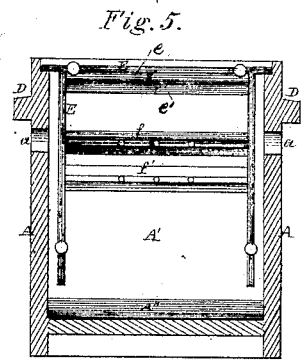
Figure 6:
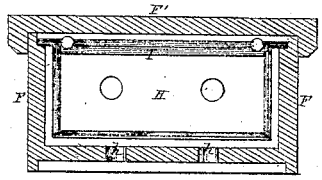
Figure 7:
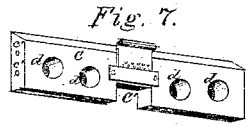

Figures 5 and 6 are sections of the two divisions of the hive on the line XI–XI of fig. 2; and Figure 7 is a view of the sliding door for the entrance to hive.

In all the figures like parts are indicated by the same letters of reference.

My improved hive consists of two parts or divisions, an upper and a lower one. In the lower division the bees are allowed to accumulate their stores for their own consumption, and in the upper division are received the surplus results of their labor, in such a form that it may be removed without disturbing the bees, and in a condition to be packed for market.

In the drawing, A, figs. 1, 2, 3, and 5, is the lower division of the hive, having an entrance, B, for the bees, extending across the whole width of the hive, near the bottom, on the front side, which entrance is provided with a sliding adjustable door, C, (see fig. 7.) The division A may also, if necessary, be furnished with a door, A', on the back, to be secured by hook and staple or any simple and equivalent device. The floor A'' of the hive slopes down from rear to front, so that refuse and dirt may not accumulate, but roll off and be easily removed through the entrance B. A weather-strip, A''', extends across the front of the hive, over the entrance, to shelter it from the weather. Strips or cleats D are secured to the sides of the division A, near the top, to serve as handles, and prevent the sides from warping, while they also act as weather-strips to protect the ventilators $a\ a$, which are perforations through the sides of the hive, covered on the inside with screens of wire gauze. On the outside of the hive are covers or valves $b\ b$, of sheet metal, whereby to regulate the ventilation. The sliding door C (see figs. 1, 3, and 7) moves in grooves cut in the inner surfaces of the sides of the hive, and is rendered adjustable in the width of its opening, and secured in place by means of pins $c$ passing through holes in the sides of the hive into holes $c'\ c'$ in the ends of the door C. It also has ventilating holes $d\ d$ through it, covered on the inside with wire gauze, and a small door-opening, C', covered with a sheet-metal slide, perforated with small holes, to be used when it is desirable to allow but a narrow space for the bees to go through into and out of the hive. In the division A of the hive are suspended the comb-frames E E'. These are shown in the drawing as being eight in number, but there may be more or less, according to the size of the hive, and are intended for the support of the stores of the bees, to be used by them during the winter. One-half of these frames has an angular strip, $e$, (see figs. 3 and 5,) extending along the under side of the top bar, say a quarter of an inch deep, and a square cross-bar, $f$, extending from one side of the frame to the other, placed at one-third of the distance down from the top bar, which cross-bar is perforated with holes for the passage of the bees through from one frame to another, when they are filled with comb. The other half of the frames E' is furnished with strips $e'$, say three-quarters of an inch deep, and has its perforated cross-bars $f'$ one-half the distance down. The frames E E' are placed alternately with each other, as shown in fig. 3, suspended on ledges in the top of the sides of the division A of the hive, and at a sufficient distance from each other and from the sides of the hive to permit the bees to pass freely in all directions around them; and they are kept in position by broad-headed tacks or little blocks of wood, placed at convenient points upon them. The cross-bars $f\ f'$ are so placed as to have a corner uppermost, that is, diagonally with the sides of the frames, and these, with the angular strips $e\ e'$, give stability to the comb as it is built, and regularity to its structure. When there is no door A' to the division, the comb-frames will be suspended from the front and rear of the hive, or at right angles with the position shown in the drawing. F is the upper division of the hive, resting upon and covering the lower division A, to which it is secured by hooks and staples $g\ g$. The top F' is hinged to the rear side, and forms a lid, which, when shut, is secured by hooks and staples $g'\ g'$. The bottom is perforated with holes *h h*, figs. 4 and 6, to permit free communication between the upper and lower divisions of the hive. In the front of the division F is a door, G, covered by a slide of perforated sheet metal, to regulate its opening, which door permits the bees to have direct access to the upper division when necessary, without causing them to travel the distance from the entrance B upwards. The door G is covered with a weather-strip, as shown in figs. 1, 2, and 3. Ventilating holes *a'*, covered on the inside with wire-gauze screens, and on the outside with regulators *b'*, are made in the sides of the upper division F similar to those in the lower division A. In the upper division F are suspended boxes or drawers H, the ends of which are not quite equal in width to the depth of the box or drawer, so that a space is left at each end through which the bees can enter between the comb and the back or bottom of the box or drawer H. The top of the box or drawer H has an angular strip, I, extending along its under side, (see figs. 3 and 6,) which serves the same purpose as the strips *e e'* in the comb-frames, before described. The boxes or drawers H are deeper than the comb-frames E E', and consequently are fewer in number. In the drawing five are shown, and they are placed at such a distance apart, and from the sides of the division F, as to permit the bees to move around between and on every side of them. Broad-headed tacks or blocks of wood are used, as on the comb-frames E E', to keep them in position. These boxes are intended to receive the comb and honey that will be made after the bees have filled the comb-frames in the lower division A of the hive, and have laid in their winter store. They can be removed as they are filled and empty boxes put in their places without disturbing the bees or the honey which they have garnered.

Having thus fully described my invention, what I claim as new therein, and desire to secure by Letters Patent, is—

1. The comb-frames E E', with their cross-bars *f f'*, perforated as and for the purpose described, in combination with the lower division A of the hive, and the door C and its adjuncts, substantially as set forth.

2. The surplus-honey boxes or drawers H, constructed substantially as and for the purpose set forth.

3. The combination of the surplus-honey boxes H, when constructed and arranged substantially as described with the upper division F.

In testimony that I claim the above-described improvement in bee-hives I have hereunto signed my name this 24th day of April, 1867.

JOHN H. HENDRICK.

Witnesses:
WM. H. TAYLOR.
JOS. J. KELLY.